United States Patent [19]
Greenberg

[11] Patent Number: 6,088,093
[45] Date of Patent: *Jul. 11, 2000

[54] METHOD FOR RESURFACING PANELS SUCH AS AUTOMOBILE PANELS OR THE LIKE

[76] Inventor: Mark Greenberg, 9871 Overhill Dr., Santa Ana, Calif. 92705

[ * ] Notice: This patent issued on a continued prosecution application filed under 37 CFR 1.53(d), and is subject to the twenty year patent term provisions of 35 U.S.C. 154(a)(2).

[21] Appl. No.: 08/944,779

[22] Filed: Oct. 6, 1997

Related U.S. Application Data

[62] Division of application No. 08/726,389, Oct. 4, 1996, Pat. No. 5,709,826.

[51] Int. Cl.[7] .............................. G01N 21/00; G01B 11/30
[52] U.S. Cl. ......................................... 356/237.3; 356/371
[58] Field of Search ..................... 356/371, 376, 356/239.8, 237.3; 365/237.2, 239.8, 237.3

[56] References Cited

U.S. PATENT DOCUMENTS 4,629,319  12/1986  Clarke et al. ................... 356/237.2
5,745,238   4/1998  Long et al. ......................... 356/371

*Primary Examiner*—Frank G. Font
*Assistant Examiner*—Zandra V. Smith
*Attorney, Agent, or Firm*—Walter A. Hackler

[57] ABSTRACT

A method for surfacing panels, such as automobile panels or the like, includes the steps of applying a thin, reflective, flexible sheet to a panel to be surfaced, illuminating the sheet and comparing differing levels of brightness on the sheet in order to identify irregularities in the panel underlying the sheet. Thereafter, removing portions of the sheet that are overlying the identified irregularities in order to expose irregular portions of the panel, correcting the identified irregular portions and removing a remaining portions of the sheet from the corrected panel.

13 Claims, 2 Drawing Sheets

METHOD FOR RESURFACING PANELS SUCH AS AUTOMOBILE PANELS OR THE LIKE

This is a division of U.S. patent application Ser. No. 08/726,389, filed on Oct. 4, 1996, now U.S. Pat. No. 5,709,826.

The present invention relates to a method of providing a smooth surface to a panel or the like and specifically relates to a method of resurfacing a panel which has been dented or otherwise distorted and is to be resurfaced to an original, smooth condition.

As an example, in auto body works, repair of dented automobile parts involves many steps. After all of the most predominant dents in an automobile panel have been pulled or punched into a form roughly resembling the original shape of the panel, smaller, more minor dents and raised areas are inevitably still present.

The final stages of resurfacing the damaged panel to its original smooth condition usually involves first filling depressed areas with an epoxy/fiberglass or the like. Several steps of grinding and sanding of the filled surface are then performed with each successive step involving progressively finer sanding tools.

This procedure often results in ripple distortions with high and low variations in the surface. The distortions are difficult to see, but typically become more visible after the finishing coat of paint, usually black or other dark colored paint, is applied. Thus, once the rippling of the surface has become apparent, the resurfacing steps have already been completed.

In passenger automobiles in particular, even minor blemishes on exterior surfaces thereof are considered serious defects to the appearance of the vehicle and consequently reduce the marketable value of the vehicle.

Unfortunately, in order to correct the problem at this point in time requires repeating the resurfacing steps. The finishing coat of paint may need to be removed, in order to provide the necessary surface texture for application of another coat of epoxy/fiberglass, and thus requiring repeating the grinding and sanding procedure, and of course, applying another finishing coat of paint.

In a quality control setting the present invention provides an inexpensive, easy method of evaluating whether a panel is ready for application of paint. For example, conventional practices for determining smoothness of a surface to be painted include the use of the gloved hands of an expert who manually feels the surface, as well as precision tools for determining the presence of irregularities.

Repainting the panel due to rippling that was not timely noticed is not an insignificant matter. Modern pollution control regulations require specially formulated paints that are "environmentally friendly". Consequently, the average price of automobile paint has increased nearly ten fold in the past decade.

With conventional techniques, restoring a damaged vehicle panel to its original condition is therefore a time consuming, expensive procedure. The present invention provides a method for significantly reducing the time and expense required to produce the ultimate smooth surface desired.

The method of the present invention is also suitable for use in evaluating surfaces formed by a die in order to determine whether the die is initially suitable for use or has developed irregularities during use. That is, the method of the present invention is also suitable for quality control of surfaces to be painted.

SUMMARY OF THE INVENTION

A method for surfacing or resurfacing panels, such as automobile panels, or the like, in accordance with the present invention, generally comprises the steps of applying a thin, reflective, flexible sheet, preferably of a dark color, to a panel to be surfaced, illuminating the sheet and comparing differing levels of brightness on the sheet in order to identify irregularities in the panel underlying the sheet, selectively removing portions of the sheet that are overlying the identified irregularities in order to expose irregular portions of the panel, correcting the identified irregular portions, and finally, removing a remaining portion of the sheet from the corrected panel.

More particularly, the sheet may comprise a dark, reflective plastic sheet, or film, that has the property of being removably adhesive to the panel. For example, the sheet, or film, may include a tacky face for causing intimate contact between the sheet and the panel, or alternatively, the sheet may adhere to the panel by surface friction alone. Preferably, the sheet is adhered to the panel in such a way that the sheet will remain substantially immovable during the cutting and smoothing process. It should be appreciated that the ideal means for adhering the sheet may vary depending upon the surface texture and composition of the panel.

Upon illumination of the surface, irregularities or surface defects that were not before obvious to the eye are readily revealed. Irregularities are accentuated, and thus more easy observed, if the illumination step includes the step of directing a light onto the sheet at an acute angle with the panel surface. If desired, the irregularities may then be marked with a felt pen, or the like.

Once irregularities have been identified and marked, portions of the sheet overlying the irregularities are removed from the panel. The step of removing the portions of the panel overlying the irregularities includes the step of cutting the sheet along perimeters of the identified irregular portions. This may be accomplished with any implement suitable for cutting the sheet, such as a razor edge, for example.

Next, the identified irregular portions may be corrected by smoothing the irregularities to a level as close as possible to a level of the surrounding, remaining flexible sheet.

The step of smoothing the irregular portions may include the steps of applying an epoxy resin to the exposed portions of the panel, allowing the epoxy resin to cure, and thereafter sanding the epoxy to about the level of the remaining portion of the sheet.

After the remaining portion of flexible sheet is removed, minor variations in smoothness may be eliminated by feathering the corrected portion into the surrounding panel, or by other suitable sanding techniques as known in the art. The corrected smoothed panel may at this point be prepared for priming, painting and finishing.

Although it is often not necessary to do so, the steps described above may be repeated in order to ensure the completed panel has the ultimate smooth finish desired prior to the application of paint or other finishes. Ideally, it is preferred that a reflective flexible sheet is again adhered to the corrected surface as before, illuminated, and levels of brightness compared, in order to assure that the irregularities have been satisfactorily removed. Obviously, if no irregularities or defects are apparent, the sheet may be immediately detached from the panel, thus completing the method.

BRIEF DESCRIPTION OF THE DRAWINGS

The present invention will be more clearly understood with reference to the following detailed description and accompanying drawings of which.

DETAILED DESCRIPTION

It should be appreciated that the method of the present invention is applicable to any surface to be painted, and is especially applicable to panels of vehicles, such as automobiles, trucks, motorcycles and the like. However, for the sake of clarity, it will be further described only with reference to automobiles.

Figure 1:
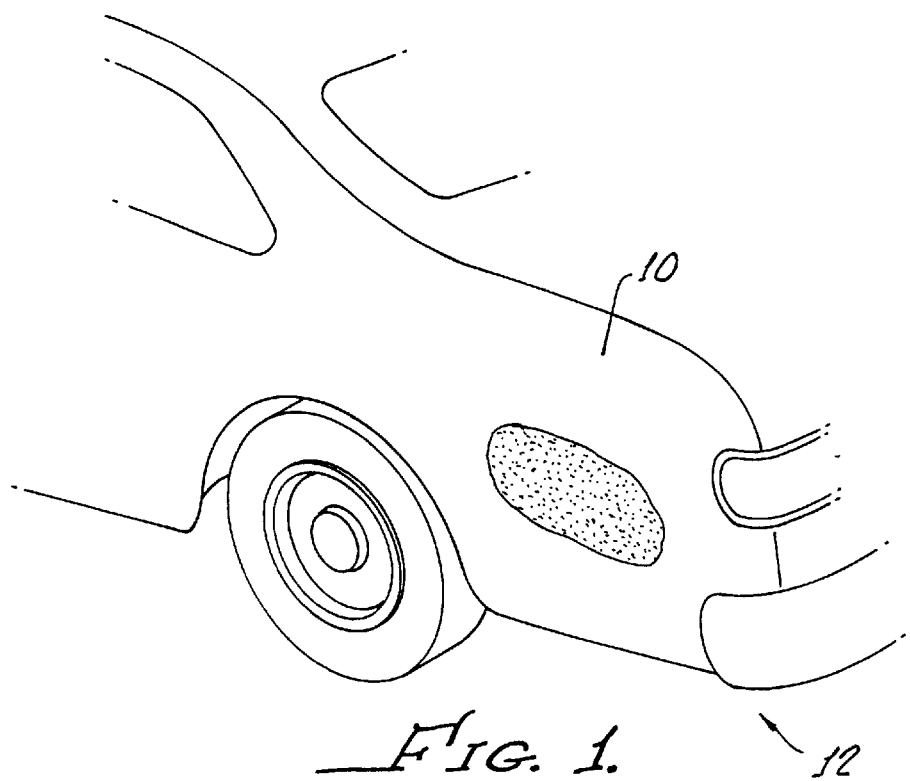
FIG. 1 shows a automobile panel to be resurfaced by using a method of the present invention, said panel having paint removed from a portion thereof and no visible surface irregularities.

Turning now to FIG. 1, a panel 10 on a vehicle 12 which has been repaired, for example, after a traffic collision, is shown. Any major dents have previously been removed from the panel 10 using conventional techniques.

Figure 2:
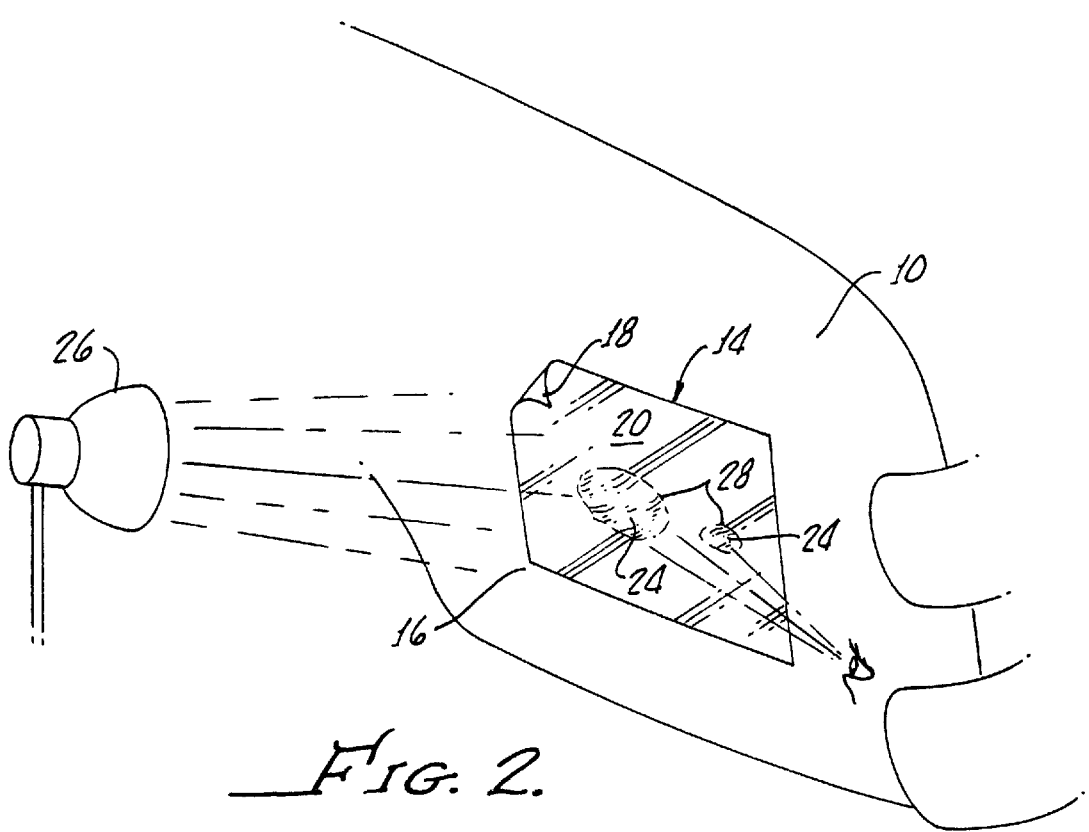
FIG. 2 shows the panel to be resurfaced after a sheet of reflective film is placed over the surface and the surface is illuminated, revealing irregularities.

As shown in FIG. 2, a method for surfacing, or resurfacing panels 10, in accordance with the present invention, comprises the step of applying a thin, reflective, flexible sheet 14 to a surface 16 of the panel 10 such that the sheet 14 adheres to the panel 10 in intimate contact therewith. Preferably, the sheet 14 is then manually smoothed in order to eliminate air bubbles that may be trapped between the sheet 14 and the surface 16.

The step of applying the sheet 14 may be performed after the surface 16 has been repaired to a condition of which surface defects are not plainly visible. In this respect, when used for automobile resurfacing, a preliminary step of the present invention may comprise preparing the panel 10 to be resurfaced, for example by applying an epoxy (not shown) to the panel 10 and allowing the epoxy to cure, before the step of applying the sheet 14.

The reflective sheet 14 is preferably a dark color, for example, black. The sheet 14 may be any suitable plastic film and includes a contact face 18 which may be covered with a removable adhesive (not shown) for securing the sheet 14 to the surface 16 in order to render the sheet 14 substantially immovable in a lateral direction during the following steps.

Alternatively, the sheet 16 may comprise any suitable film which releasably bonds to the surface primarily by surface friction forces. It should be appreciated that the type of material of which the sheet is composed may vary depending upon the composition of the panel to which it is to be adhered.

Importantly, the sheet 14 has a reflective upper face 20. The method of the present invention includes the step of illuminating the sheet 14 after the sheet 14 has been thoroughly smoothed over the surface 16. Next, levels of brightness reflected from the sheet 14 are visually compared in order to identify irregularities 24 in surface contour. The present invention enables visual identification of even benign surface ripples that were imperceptible prior to the application of the reflective sheet 14.

Preferably, the step of illuminating comprises the step of directing a light source 26 at an acute angle onto the sheet 14 in order to accentuate high and low variations in surface contour, and thus irregularities are more easily identified. Subsequently, it is useful to mark the irregularities, by roughly outlining both high and low variations in contour using a felt marker, for example.

In addition, by visually scanning, or "eye-balling" the sheet-covered surface 16 from a variety of angles, in other words, from at least two different angles, the irregularities 24 become increasingly more defined. Therefore, the present invention may include the step of visually scanning the illuminated surface along an arc of about 180 degrees. Markings 28, denoting locations, particularly perimeters, of noticed defects or irregularities, may be made frequently during the visual scanning step.

Figure 3:
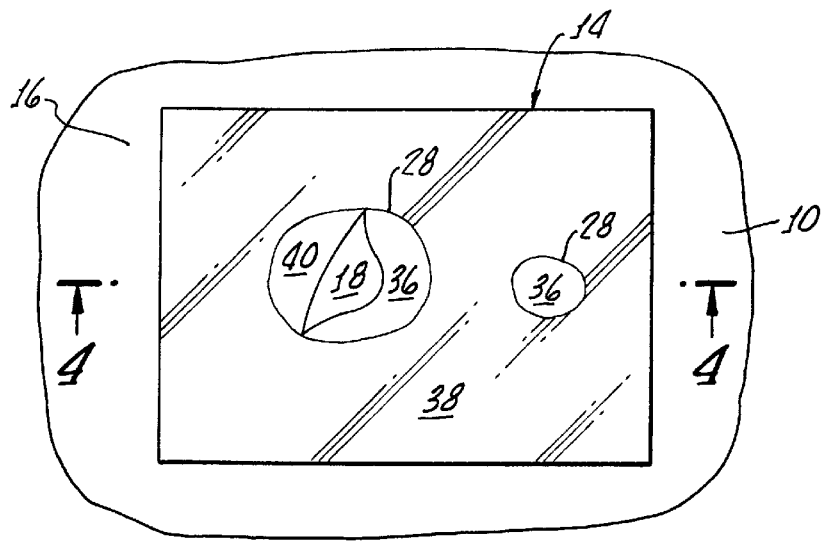
FIG. 3 shows irregularities marked on the sheet and the marked portions being cut out of the sheet.

Turning now to FIG. 3, sheet portions 36 overlying the identified irregularities 24 are then selectively removed from a balance, or remainder 38, of the sheet 14 in order to expose panel portions 40 including identified irregularities 24.

This step may be accomplished by utilizing a razor or other suitable sharp-edged implement (not shown) to cut away the sheet 14 along the marked perimeters 28, and subsequently stripping, or peeling, the areas 36 from the panel surface 16.

Figure 4:
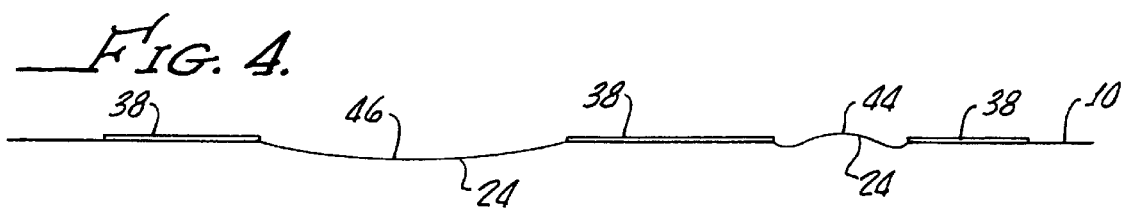
FIG. 4 shows a cross-sectional view of the sheet taken along line 4—4 of FIG. 3 after the marked portions have been removed.

Shown in FIG. 4 is a cross sectional view of the panel in FIG. 3 after sheet portions 36 have been removed. In this example, the irregularities 24 comprise generally a raised area 44 and a depression 46.

Figure 5:
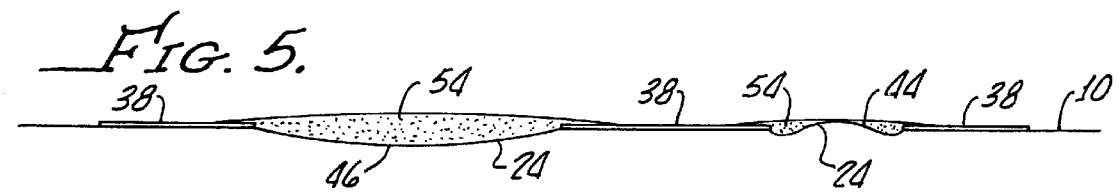
FIG. 5 shows the same view as FIG. 4 after epoxy has been applied to the exposed irregular surface.
Figure 6:
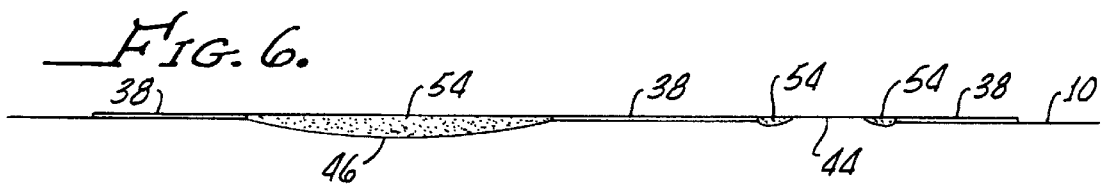
FIG. 6 shows the same view of FIG. 5 after irregular surfaces have been smoothed.
Figure 7:
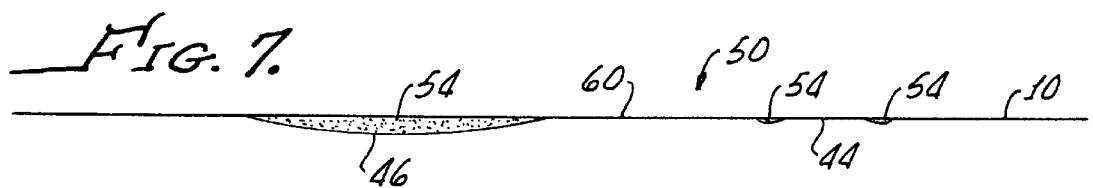
FIG. 7 shows the same cross sectional view as FIG. 6 after the plastic sheet has been removed from the panel.

Now referring to FIGS. 5 through 7, steps which relate to correction of the irregularities 24 and attainment of a smooth finish 50, are shown in cross-sectional view. Particularly, while the remaining sheet 38 is still adhered to the panel 10, the exposed surfaces are corrected as described hereinafter.

For example, as shown in FIG. 5, an epoxy resin 54 is applied to the exposed portions 40 in an amount sufficient to cover the irregularities 24 up to at least a level defined by the remaining sheet 38. This will ensure that all depressions 46 are completely filled. The epoxy resin 54 may comprise any suitable substance known in the resurfacing art, which will vary depending on the type and composition of the panel 10 being resurfaced.

After allowing it to cure, the epoxy resin 54 is sanded or otherwise planed, to a level about equal to the level of the remaining sheet 38, as shown in FIG. 6. After the sanding step, the remaining sheet 38 is removed from the panel 10.

Preferably, the corrected irregularities 24 are further smoothed by feathering, a technique suitable for eliminating any coarse surfaces between the sanded epoxy 54 and the now exposed surrounding panel 60. This feathering step will result in the desired smooth surface 50 as shown in FIG. 7.

Preferably, the steps described above may be repeated at this point, in order to ensure the panel 10 has the ultimate smooth finish desired. In particular, again a thin reflective flexible sheet is applied to the panel and illuminated. Differing levels of brightness are compared in order to identify any remaining irregularities in the panel. If irregularities are identified, they are marked and portions of the sheet are removed in order to expose the irregularities. The irregularities may then corrected as described above.

It should be appreciated that the method of the present invention may be used in a quality control setting for identifying irregularities and defects in a preferably smooth panel. For example in a automobile manufacturing plant, a panel which is to be painted can be quickly inspected, utilizing a method in accordance with the present invention, to ensure the panel has the smooth surface desired prior to application of paint. Minor ripples and other imperfections that are typically only noticeable after paint has been applied can be corrected, thus reducing the occurrence of costly errors.

In addition, as hereinabove noted, the method in accordance with the present invention may be utilized to evaluate surface smoothness without repair thereof, as for example, to evaluate the quality of tools and dies used for making the surface.

Although there has been hereinabove described a method for surfacing, or resurfacing, panels such as automobile panels or the like, in accordance with the present invention, for the purpose of illustrating the manner in which the invention may be used to advantage, it will be appreciated that the invention is not limited thereto. Accordingly, any and all modifications, variations, or equivalent arrangements which may occur to those skilled in the art should be considered to be within the scope of the invention as defined in the appended claims.

What is claimed is:

1. A method for evaluating surface smoothness, said method comprising the steps of:
    (a) applying a thin, reflective, flexible sheet to a portion of a panel to be evaluated for smoothness, the sheet being smaller than the panel in order that other portions of the panel extend outside of the sheet;
    (b) manually smoothing the sheet in order to eliminate air bubbles between the sheet and the panel portion; and
    (c) illuminating the sheet and comparing differing levels of brightness on the sheet in order to identify irregularities in the panel portion underlying the sheet.

2. The method according to claim 1 wherein the step of applying a sheet consists of applying a thin, reflective, flexible, dark sheet to the panel portion.

3. The method according to claim 1 wherein the step of illuminating includes the step of directing a light source at an acute angle onto the sheet in order to accentuate high and low variations in the panel portion beneath the sheet.

4. The method according to claim 1 wherein the step of applying the sheet includes securing the sheet with an adhesive in order to render the sheet substantially immovable during the step of illuminating the sheet.

5. The method according to claim 1 wherein the step of applying the sheet includes securing the sheet by means of friction between the panel and the sheet.

6. A method for evaluating surface smoothness, said method comprising the steps of:
    (a) applying a thin, reflective, flexible sheet to a panel to be evaluated for smoothness;
    (b) manually smoothing the sheet in order to eliminate air bubbles between the sheet and the panel;
    (c) illuminating the sheet for comparing differing levels of brightness on the sheet in order to identify irregularities in the panel underlying the sheet;
    (d) visually scanning the illuminated sheet from at least two different angles; and
    (e) marking the sheet during the visual scanning step such that the irregularities become increasingly more defined.

7. A method for evaluating surface smoothness of a surface, said method comprising the steps of:
    (a) applying a reflective sheet to a portion of a surface to be evaluated for smoothness, the sheet being smaller than the surface in order that other portions of the surface extend outside of the sheet;
    (b) illuminating the sheet applied to the surface portion by directing a light source onto the sheet at an acute angle with respect to the surface portion;
    (c) manually smoothing the sheet in order to eliminate air bubbles between the sheet and the surface portion; and
    (d) comparing differing levels of brightness on the illuminated sheet by visually scanning the sheet from at least two different angles in order to identify variations in contour on the surface portion.

8. The method according to claim 7 wherein the step of applying a sheet comprises applying a thin, reflective, dark sheet to the surface to be evaluated.

9. The method according to claim 7 further comprising the step of making markings on the sheet, denoting locations of the irregularities, during the step of illuminating.

10. A method for evaluating surface smoothness, said method comprising the steps of:
    (a) removably adhering a thin, reflective, flexible sheet to a portion of a panel to be evaluated for smoothness, the sheet being smaller than the panel in order that other portions of the panel extend outside of the sheet;
    (b) manually smoothing the sheet in order to eliminate air bubbles between the panel portion and the sheet; and
    (c) illuminating the sheet and comparing different levels of brightness on the sheet in order to identify irregularities in the panel portion underlying the sheet.

11. The method according to claim 10 wherein the step of removably adhering the sheet includes vertically adhering the sheet to the panel portion, adherence of the sheet to the panel portion maintaining portion of the sheet during the step of illuminating the sheet.

12. The method according to claim 11 further including repeating steps a–c over different portions of the panel.

13. The method according to claim 12 further including repeating steps a–c over different portions of the panel.

* * * * *